United States Patent
Pattison et al.

(10) Patent No.: US 10,594,820 B2
(45) Date of Patent: Mar. 17, 2020

(54) CONDITIONALLY JOINING DATA FROM COOKIES

(71) Applicant: Google Inc., Mountain View, CA (US)

(72) Inventors: David Pattison, Long Beach, CA (US); Bradley David Townsend, Santa Ana, CA (US); Avi Mehta, Irvine, CA (US)

(73) Assignee: Google LLC, Mountain View, CA (US)

( * ) Notice: Subject to any disclaimer, the term of this patent is extended or adjusted under 35 U.S.C. 154(b) by 664 days.

(21) Appl. No.: 14/551,864

(22) Filed: Nov. 24, 2014

(65) Prior Publication Data
US 2016/0150042 A1 May 26, 2016

(51) Int. Cl.
*H04L 29/08* (2006.01)
*H04W 4/21* (2018.01)

(52) U.S. Cl.
CPC .......... *H04L 67/2814* (2013.01); *H04L 67/02* (2013.01); *H04W 4/21* (2018.02)

(58) Field of Classification Search
CPC ..... H04L 67/2814; H04L 67/02; H04L 29/08; H04L 29/08072; H04L 29/06; H04L 29/0809; H04L 29/06047; H04W 4/206; H04W 4/21; G06Q 30/02
USPC ........... 709/203, 201, 208; 715/744; 712/28; 714/744
See application file for complete search history.

(56) References Cited

U.S. PATENT DOCUMENTS

| | | | |
|---|---|---|---|
| 6,643,641 B1 * | 11/2003 | Snyder | G06F 16/951 707/709 |
| 8,645,453 B2 | 2/2014 | Cheng et al. | |
| 8,805,946 B1 | 8/2014 | Glommen | |
| 8,825,757 B2 | 9/2014 | Lunt et al. | |
| 2003/0093335 A1 * | 5/2003 | Silverbrook | G06Q 20/10 705/26.1 |
| 2008/0195462 A1 | 8/2008 | Magdon-Ismail et al. | |
| 2011/0202678 A1 * | 8/2011 | LaVoie | H04L 67/327 709/238 |
| 2013/0238745 A1 * | 9/2013 | Ramachandran | H04N 21/2396 709/217 |
| 2013/0282898 A1 * | 10/2013 | Kalus | H04L 67/146 709/224 |

(Continued)

FOREIGN PATENT DOCUMENTS

WO  WO-2010/042978 A1  4/2010

*Primary Examiner* — Tonia L Dollinger
*Assistant Examiner* — Mehulkumar J Shah
(74) *Attorney, Agent, or Firm* — Foley & Lardner LLP

(57) ABSTRACT

Conditionally combining data from several sources may include retrieving data from several sources in response to a single request and using one or more redirection responses. The request from a client device may include a device identifier, a third-party identifier, a join identifier based, at least in part, on the device identifier, and first data from a first source, such as a first cookie, associated with the received request. A redirection destination may be determined based on configuration data associated with the third-party identifier, such as whether one or more services are selected and/or activated by a publisher of a resource. A redirection response is transmitted to the client device responsive to the received request and includes the redirection destination and the join identifier. The first data from the received request and second data received from the redirection destination may be associated based on the join identifier.

14 Claims, 6 Drawing Sheets

(56) References Cited

U.S. PATENT DOCUMENTS

| | | | |
|---|---|---|---|
| 2013/0346488 A1* | 12/2013 | Lunt | G06F 17/30876 709/203 |
| 2014/0032708 A1* | 1/2014 | Zamir | H04L 67/10 709/217 |
| 2014/0278927 A1* | 9/2014 | Close | G06Q 30/0246 705/14.45 |
| 2014/0280919 A1* | 9/2014 | Lakes | G06Q 30/0601 709/224 |
| 2014/0365304 A1* | 12/2014 | Showers | G06Q 30/02 705/14.55 |
| 2015/0052217 A1* | 2/2015 | Benguerah | G06Q 30/02 709/217 |

\* cited by examiner

CONDITIONALLY JOINING DATA FROM COOKIES

BACKGROUND

In a networked environment, such as the Internet or other networks, first-party content providers can provide information for public presentation on resources, for example webpages, documents, applications, and/or other resources. The first-party content can include text, video, and/or audio information provided by the first-party content providers via, for example, a resource server for presentation on a client device over the Internet. The first-party content may be a webpage requested by the client device or a stand-alone application (e.g., a video game, a chat program, etc.) running on the client device. Additional third-party content can also be provided by third-party content providers for presentation on the client device together with the first-party content provided by the first-party content providers. For example, the third-party content may be a public service announcement or advertisement that appears in conjunction with a requested resource, such as a webpage (e.g., a search result webpage from a search engine, a webpage that includes an online article, a webpage of a social networking service, etc.) or with an application (e.g., an advertisement within a game). Thus, a person viewing a resource can access the first-party content that is the subject of the resource as well as the third-party content that may or may not be related to the subject matter of the resource.

SUMMARY

Implementations described herein relate to combining data from several cookies. The combination of data from several cookies may include retrieving data from several cookies in response to a single request using one or more redirection responses. The redirection responses may specify a redirection destination at the same analytics system that transmits the redirection responses to a client device or the redirection responses may specify redirection destinations of other systems. That is, when a resource, such as a web page of a publisher, is requested by a browser of a client device, the coding for the resource may include analytics coding that causes the browser to transmit data to an analytics server, such as via a request to the analytics server, that includes data about the client device and/or included in a cookie or other data file stored in a storage device of the client device and a join identifier (e.g., a globally unique identifier for the request). The request may include a third-party identifier associated with the publisher of the resource such that the analytics system may retrieve configuration data associated with an account of the publisher. Based on the configuration data, one or more redirection destinations may be determined based on one or more features that have been enabled in the configuration data, but may not have been implemented in the code for the resource. The analytics system may then transmit a redirection response responsive to the received request. The redirection response may include the redirection destination and the join identifier. Data from the redirection destination, such as second cookie data, may be received by the analytics system and combined with the data received with the request.

In some implementations, a subsequent redirection from the redirection destination may be transmitted responsive to a request that is responsive to the original redirection response. The subsequent redirection may also include the join identifier such that the data from the subsequent redirection may be combined with the data from the original request and the first redirection. Thus, a single join identifier may be transmitted to several redirection destinations such that data from the several redirection destinations, such as data associated with various cookies, may be associated with the same join identifier to be subsequently combined. In some implementations, the configuration data may also be used to combine the data from the several redirection destinations, either in addition to or in lieu of the join identifier.

One implementation relates to a method that includes receiving a request from a client device. The request may include a device identifier associated with the client device, a third-party identifier, a join identifier based, at least in part, on the device identifier, and first data associated with the received request. The method may also include determining a redirection destination based on configuration data associated with the third-party identifier and transmitting, to the client device, a redirection response responsive to the received request. The redirection response may include the redirection destination and the join identifier. The method may further include associating the first data from the received request with second data received from the redirection destination based on the join identifier.

Another implementation relates to a system that may include one or more data processors and one or more storage devices. The one or more storage devices includes instructions that cause the one or more processors to perform several operations. The operations may include receiving a first request from a client device at a first service of an analytics system. The first request may include a device identifier associated with the client device, a third-party identifier, a join identifier based, at least in part, on the device identifier, and first data associated with the received first request. The operations may also include determining a redirection destination associated with a second service of the analytics system based on configuration data associated with the third-party identifier. The operations may further include transmitting to the client device a redirection response that includes the redirection destination and the join identifier. The operations may still further include associating the first data from the received first request with second data from the redirection destination based on the join identifier.

Yet a further implementation relates to a computer-readable storage device storing instructions that, when executed by one or more data processors, cause the one or more data processors to perform several operations. The operations may include transmitting a request for a resource to a resource server from a client device and receiving data for the resource from the resource server. The data for the resource may include an analytics script. The operations may also include determining if one or more analytics features are active based on the data for the resource and the analytics script. The operations may further include transmitting, to an analytics system, a first request that includes a device identifier associated with the client device, a third-party identifier associated with the requested resource, a join identifier based, at least in part, on the device identifier, and first data associated with the first request. The operations may also include receiving, from the analytics system, a redirection response that includes a redirection destination and the join identifier. The redirection destination may be based on configuration data associated with the third-party identifier. The operations may still further include transmitting, to the redirection destination, a second request that includes the device identifier associated with the client device, the join identifier, and second data associated with the second request.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
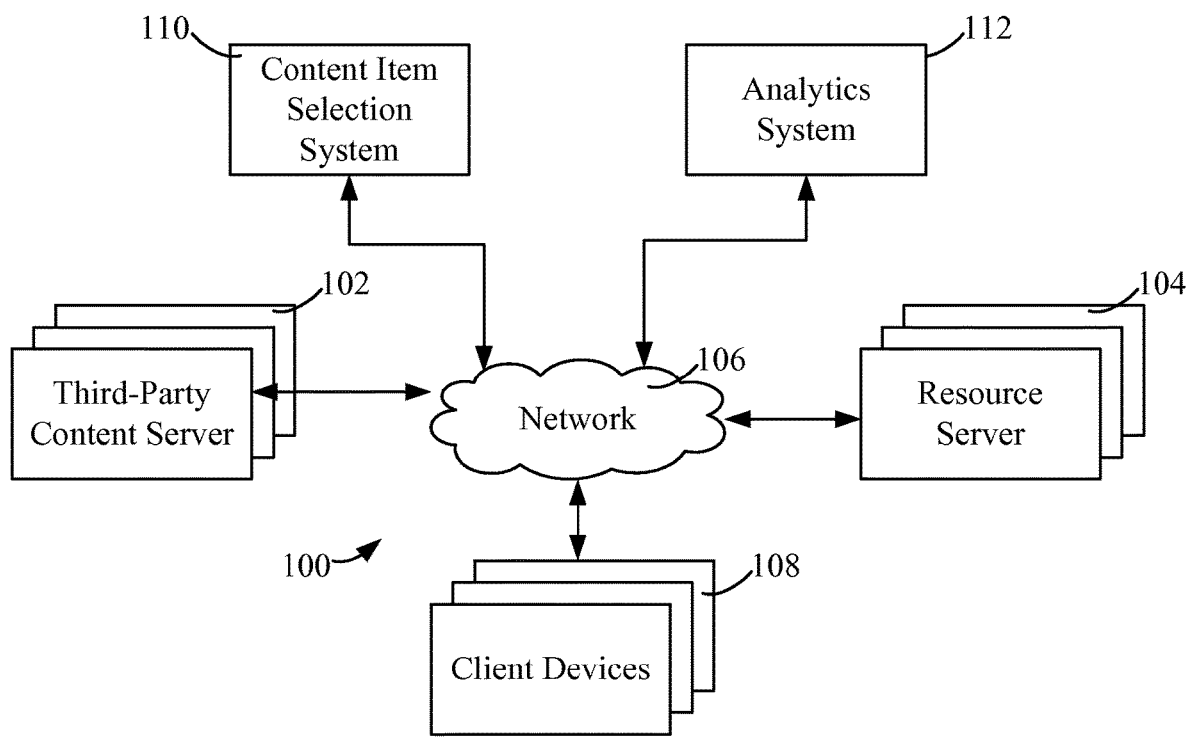
FIG. 1 is an overview depicting an implementation of a system of providing information via a computer network.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and implementations of, methods, apparatuses, and systems for providing information on a computer network. The various concepts introduced above and discussed in greater detail below may be implemented in any of numerous ways as the described concepts are not limited to any particular manner of implementation. Examples of specific implementations and applications are provided primarily for illustrative purposes.

A computing device (e.g., a client device) can view a resource, such as a webpage, a document, an application, etc. In some implementations, the computing device may access the resource via the Internet by communicating with a server, such as a webpage server, corresponding to that resource. The resource includes first-party content that is the subject of the resource from a first-party content provider and may also include additional third-party provided content, such as advertisements or other content. In one implementation, responsive to receiving a request to access a webpage, a webpage server and/or a client device can communicate with a data processing system, such as a content item selection system, to request a content item to be presented with the requested webpage, such as through the execution of code of the resource to request a third-party content item to be presented with the resource. The content item selection system can select a third-party content item and provide data to effect presentation of the content item with the requested webpage on a display of the client device. In some instances, the content item is selected and served with a resource associated with a search query response. For instance, a search engine may return search results on a search results webpage and may include third-party content items related to the search query in one or more content item slots of the search results webpage.

The computing device (e.g., a client device) may also be used to view or execute an application, such as a mobile application. The application may include first-party content that is the subject of the application from a first-party content provider and may also include additional third-party provided content, such as advertisements or other content. In one implementation, responsive to use of the application, a resource server and/or a client device can communicate with a data processing system, such as a content item selection system, to request a content item to be presented with a user interface of the application and/or otherwise. The content item selection system can select a third-party content item and provide data to effect presentation of the content item with the application on a display of the client device.

In some instances, a device identifier may be associated with the client device. The device identifier may be a randomized number associated with the client device to identify the device during subsequent requests for resources and/or content items. In some instances, the device identifier may be configured to store and/or cause the client device to transmit information related to the client device to the content item selection system and/or resource server (e.g., values of sensor data, a web browser type, an operating system, historical resource requests, historical content item requests, etc.).

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For instance, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A third-party content provider, when providing third-party content items for presentation with requested resources via the Internet or other network, may utilize a content item management service to control or otherwise influence the selection and serving of the third-party content items. For instance, a third-party content provider may specify selection criteria (such as keywords) and corresponding bid values that are used in the selection of the third-party content items. The bid values may be utilized by the content item selection system in an auction to select and serve content items for presentation with a resource. For instance, a third-party content provider may place a bid in the auction that corresponds to an agreement to pay a certain amount of money if a user interacts with the provider's content item (e.g., the provider agrees to pay $3 if a user clicks on the provider's content item). In other instances, a third-party content provider may place a bid in the auction that corresponds to an agreement to pay a certain amount of money if the content item is selected and served (e.g., the provider agrees to pay $0.005 each time a content item is selected and served or the provider agrees to pay $0.05 each time a content item is selected or clicked). In some instances, the content item selection system uses content item interaction data to determine the performance of the third-party content provider's content items. For instance, users may be more inclined to click on third-party content items on certain webpages over others. Accordingly, auction bids to place the third-party content items may be higher for high-performing webpages, categories of webpages, and/or other criteria, while the bids may be lower for low-performing webpages, categories of webpages, and/or other criteria.

In some instances, one or more performance metrics for the third-party content items may be determined and indications of such performance metrics may be provided to the third-party content provider via a user interface for the content item management account. For instance, the performance metrics may include a cost per impression (CPI) or cost per thousand impressions (CPM), where an impression may be counted, for instance, whenever a content item is selected to be served for presentation with a resource. In some instances, the performance metric may include a click-through rate (CTR), defined as the number of clicks on the content item divided by the number of impressions. Still other performance metrics, such as cost per action (CPA) (where an action may be clicking on the content item or a link therein, a purchase of a product, a referral of the content item, etc.), conversion rate (CVR), cost per click-through (CPC) (counted when a content item is clicked), cost per sale (CPS), cost per lead (CPL), effective CPM (eCPM), and/or other performance metrics may be used.

In some instances, a webpage or other resource (such as, for instance, an application) includes one or more content item slots in which a selected and served third-party content item may be displayed. The code (e.g., JavaScript®, HTML, etc.) defining a content item slot for a webpage or other resource may include instructions to request a third-party content item from the content item selection system to be presented with the webpage. In some implementations, the code may include an image request having a content item request URL that may include one or more parameters (e.g., /page/contentitem?devid=abc123&devnfo=A34r0). Such parameters may, in some implementations, be encoded strings such as "devid=abc123" and/or "devnfo=A34r0."

The selection of a third-party content item to be served with the resource by a content item selection system may be based on several influencing factors, such as a predicted click through rate (pCTR), a predicted conversion rate (pCVR), a bid associated with the content item, etc. Such influencing factors may be used to generate a value, such as a score, against which other scores for other content items may be compared by the content item selection system through an auction.

During an auction for a content item slot for a resource, such as a webpage, several different types of bid values may be utilized by third-party content providers for various third-party content items. For instance, an auction may include bids based on whether a user clicks on the third-party content item, whether a user performs a specific action based on the presentation of the third-party content item, whether the third-party content item is selected and served, and/or other types of bids. For instance, a bid based on whether the third-party content item is selected and served may be a lower bid (e.g., $0.005) while a bid based on whether a user performs a specific action may be a higher bid (e.g., $5). In some instances, the bid may be adjusted to account for a probability associated with the type of bid and/or adjusted for other reasons. For instance, the probability of the user performing the specific action may be low, such as 0.2%, while the probability of the selected and served third-party content item may be 100% (e.g., the selected and served content item will occur if it is selected during the auction, so the bid is unadjusted). Accordingly, a value, such as a score or a normalized value, may be generated to be used in the auction based on the bid value and the probability or another modifying value. The value or score for a bid based on whether the third-party content item is selected and served may be $0.005*1.00=0.005 and the value or score for a bid based on whether a user performs a specific action may be $5*0.002=0.01. To maximize the income generated, the content item selection system may select the third-party content item with the highest value from the auction. In some implementations, the content item selection system may select the content item associated with the bid based on whether the user performs the specific action due to the higher value or score associated with that bid.

Once a third-party content item is selected by the content item selection system, data to effect presentation of the third-party content item on a display of the client device may be provided to the client device using a network.

In some implementations, a first-party content provider, such as a publisher of a webpage, may also be a third-party content provider. For instance, a publisher of a website may have content items, such as advertisements, that the content provider would like to present to a visitor of the website subsequent to the visitor viewing the website. Such content items may be presented on a display of a client device of the visitor when the visitor is viewing websites of other content providers. Such a remarketing feature may be selected and enabled by the third-party content provider via configuration settings for an account with a content item selection system. Such remarketing features and/or other enabled features for the content provider may be associated with data logs or files generated and/or stored on the client device. That is, when a client device requests the resource of a content provider, such as one having remarketing content items, a script associated with the resource may be executed that results in the generation or updating of a data log or file stored in a storage device of the client device. The data from the data log or file may be later transmitted to the content item selection system for selection of the content provider's content items for remarketing and/or for analytic purposes. However, in some instances the content provider may select and enable such a feature by modifying the configuration settings of the content provider's account for the content item selection system, but may omit updating the data for the resource with the corresponding script and/or to generate the request to the content item selection system. Thus, although the content provider indicated that they would like such a remarketing feature activate, the feature has not been implemented by the content provider for the resource. Accordingly, implementing the feature based on the configuration settings for the content provider may be useful for content providers.

Moreover, in some implementations the content provider may also utilize analytics information or data from an analytics system for the resource, such as data about the visitors that view the resource, usage of the resource, etc. Such analytics data may be transmitted to the analytics system based on the execution of a script associated with the resource and/or via a request to the analytics system. In some instances, the execution of the script and/or request may result in the generation or updating of a data log or file stored in a storage device of the client device for the analytics data.

In some instances, the analytics data and the data log or file for the features associated with content items of the content provider may have different information and/or may be controlled by different system, which may be useful to be combined to provide a more complete representation of how a visitor interacts with the resource and/or the content items. That is, analytics data cookies, such as a first-party cookie for a resource, and third-party cookies, such as a cookie for content items, for a publisher and/or third-party content provider may be set for resources, such as a publisher's website that a visitor is visiting using a client device and/or for content items and/or third-party sites. Since the use of first and third-party cookies is not mutually exclusive, some of the data about a visitor to the resource may be stored in first-party cookie while other data may be in a third-party cookie. Thus, it may be useful to join the two sources of data to provide more complete data. To join the different data sources, a common element, such as a join identifier, may be present in or transmitted with both data sources, such as the analytics data cookie and the third-party cookie, to match the data sources.

As noted above, in some implementations, although a content provider has indicated that they would like a feature to be activated, such as one that generates and/or collects the third-party cookie for remarketing, the feature may not be implemented by the content provider for the resource to generate the third-party cookie, generate a join identifier for the third-party cookie to match with a join identifier of the analytics data cookie, and/or collect the data from such cookies. Accordingly, it may be useful to a publisher to implement the features based on the configuration settings of the publisher without needing modification of the resource. That is, when analytics data, such as that stored in an analytics data cookie, is transmitted to the analytics system based on the execution of a script associated with the resource and/or via a request to the analytics system by the client device, the analytics system may retrieve the configuration data associated with the publisher of the resource based on a third-party identifier of the publisher included with the request and/or analytics data. Based on the configuration data, the analytics system may send a redirection response, such as a 302 response, to the client device to cause a browser executing on the client device to send a subsequent request to a redirection destination. For instance, the configuration data may indicate that a feature is activated for the publisher for remarketing of content items of the publisher, but such a remarketing feature may not have been implemented by the publisher for the resource (e.g., by modifying the code of the resource and/or including the particular script). The request to the redirection destination may resolve this deficiency by causing the generation and/or collection of additional data, such as a third-party cookie. That is, the redirection response may redirect the browser of the client device to a service associated with the feature, such as the remarketing service for setting a remarketing third-party cookie and/or for collecting data from the remarketing cookie. If the configuration data does not indicate that a feature is activated, then no redirection response may be sent to the client device. Instead, an acknowledgement, such as a 200 OK response, may be transmitted.

While the foregoing has provided an overview of utilizing redirection responses based on configuration data to implement various services and/or collect and join data from a client device, implementations of such systems will now be described in greater detail.

FIG. 1 is a block diagram of an implementation of a system 100 for providing information via at least one computer network such as the network 106. The network 106 may include a local area network (LAN), wide area network (WAN), a telephone network, such as the Public Switched Telephone Network (PSTN), a wireless link, an intranet, the Internet, or combinations thereof. The system 100 can also include at least one data processing system, such as a content item selection system 110. The content item selection system 110 can include at least one logic device, such as a computing device having a data processor, to communicate via the network 106, for instance with a resource server 104, a client device 108, an analytics system 112, and/or a third-party content server 102. The content item selection system 110 can include one or more data processors, such as a content placement processor, configured to execute instructions stored in a memory device to perform one or more operations described herein. In other words, the one or more data processors and the memory device of the content item selection system 110 may form a processing module. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C #, Java®, JavaScript®, Perl®, HTML, XML, Python®, and Visual Basic®. The processor may process instructions and output data to effect presentation of one or more content items to the resource server 104 and/or the client device 108. In addition to the processing circuit, the content item selection system 110 may include one or more databases configured to store data. The content item selection system 110 may also include an interface configured to receive data via the network 106 and to provide data from the content item selection system 110 to any of the other devices on the network 106. The content item selection system 110 can include a server, such as an advertisement server or otherwise.

The system 100 can also include another data processing system, such as an analytics system 112. The analytics system 112 can include at least one logic device, such as a computing device having a data processor, to communicate via the network 106, for instance with a resource server 104, a client device 108, and/or a third-party content server 102. The analytics system 112 can include one or more data processors, configured to execute instructions stored in a memory device to perform one or more operations described herein. In other words, the one or more data processors and the memory device of the analytics system 112 may form a processing module. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C #, Java®, JavaScript®, Perl®, HTML, XML, Python®, and Visual Basic®. The processor may process instructions and output data to the resource server 104 and/or the client device 108, such as analytics data, an analytics report, etc. In addition to the processing circuit, the analytics system 112 may include one or more databases configured to store data. The analytics system 112 may also include an interface configured to receive data via the network 106 and to provide data from the analytics system 112 to any of the other devices on the network 106. The analytics system 112 can include a server, such as an analytics server or otherwise. In some implementations, the content item selection system 110 and the analytics system 112 may be part of the same system or groupings of systems. For instance, the content item selection system 110 and the analytics system 112 may each be a subsystem of a main system and/or the analytics system 112 may be a subsystem of the content item selection system 110.

The analytics system 112 may generate statistical or other data about a resource, such as information resource traffic or other activity, about a third-party content item, etc. and may transmit the data to any other system via the network 106. The analytics system 112 can include an analytics report request system, a performance metric generation system, and a database. The analytics report request system and the performance metric generation system may each include a data processor, server, virtual server, circuit, engine, agent, appliance, or other logic device such as programmable logic arrays configured to communicate with the database and with other computing devices (e.g., the resource server 104 and/or client device 108) via the network 106.

The analytics report request system and the performance metric generation system may include or execute at least one computer program or at least one script. The analytics report request system and the performance metric generation system of the analytics system 112 can be separate components, a single component, or part of the analytics system 112. The analytics report request system and the performance metric generation system can include combinations of software and hardware, such as one or more processors configured to execute one or more scripts to obtain requests for reports or performance metrics for resources, such as determining a number of visits to resources by audience segments, determining an aggregate number of visits to resources, identifying first metrics based on the number of visits to resources by audience segments and the aggregate number of visits to resources, obtaining global audience segments based on global aggregate audience data, determining second metrics based on the global audience segment of the global aggregate audience data, generating performance metrics for the resource based on the second metrics, etc. A publisher associated with the resource may request and/or receive analytics reports based on the data generated by the analytics system 112.

The client device 108 can include one or more devices such as a computer, laptop, desktop, smart phone, tablet, personal digital assistant, set-top box for a television set, a smart television, or server device configured to communicate with other devices via the network 106. The device may be any form of electronic device that includes a data processor and a memory. The memory may store machine instructions that, when executed by a processor, cause the processor to perform one or more of the operations described herein. The memory may also store data to effect presentation of one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C #, HTML, Java®, JavaScript®, Perl®, Python®, Visual Basic®, and XML.

The client device 108 can execute a software application (e.g., a web browser or other application) to retrieve content from other computing devices over network 106. Such an application may be configured to retrieve first-party content from a resource server 104. In some cases, an application running on the client device 108 may itself be first-party content (e.g., a game, a media player, etc.). In one implementation, the client device 108 may execute a web browser application which provides a browser window on a display of the client device. The web browser application that provides the browser window may operate by receiving input of a uniform resource locator (URL), such as a web address, from an input device (e.g., a pointing device, a keyboard, a touch screen, or another form of input device). In response, one or more processors of the client device executing the instructions from the web browser application may request data from another device connected to the network 106 referred to by the URL address (e.g., a resource server 104). The other device may then provide web page data and/or other data to the client device 108, which causes visual indicia to be displayed by the display of the client device 108. Accordingly, the browser window displays the retrieved first-party content, such as web pages from various websites, to facilitate user interaction with the first-party content.

The resource server 104 can include a computing device, such as a server, configured to host a resource, such as a web page or other resource (e.g., articles, comment threads, music, video, graphics, search results, information feeds, etc.). The resource server 104 may be a computer server (e.g., a file transfer protocol (FTP) server, file sharing server, web server, etc.) or a combination of servers (e.g., a data center, a cloud computing platform, etc.). The resource server 104 can provide resource data or other content (e.g., text documents, PDF files, and other forms of electronic documents) to the client device 108. In an implementation, the client device 108 can access the resource server 104 via the network 106 to request data to effect presentation of a resource of the resource server 104.

The resource of the resource server 104 may have resource data, such as a mark-up language file, a script, etc. that, when executed by the client device 108, causes the client device 108 to communicate with the analytics system 112. Thus, when a client device 108 requests the resource, the resource data may be executed by the client device 108 to cause the client device 108 to communicate with the analytics system 112, such as to generate or set a cookie, transmit data from a cookie, etc.

One or more third-party content providers may have third-party content servers 102 to directly or indirectly provide data for third-party content items to the content item selection system 110 and/or to other computing devices via network 106. The content items may be in any format that may be presented on a display of a client device 108, for instance, graphical, text, image, audio, video, etc. The content items may also be a combination (hybrid) of the formats. The content items may be banner content items, interstitial content items, pop-up content items, rich media content items, hybrid content items, Flash® content items, cross-domain iframe content items, etc. The content items may also include embedded information such as hyperlinks, metadata, links, machine-executable instructions, annotations, etc. In some instances, the third-party content servers 102 may be integrated into the content item selection system 110 and/or the data for the third-party content items may be stored in a database of the content item selection system 110.

In an implementation, the content item selection system 110 can receive, via the network 106, a request for a content item to present with a resource. The received request may be received from a resource server 104, a client device 108, and/or any other computing device. The resource server 104 may be owned or ran by a first-party content provider that may include, such as in the resource data, instructions for the content item selection system 110 to provide third-party content items with one or more resources of the first-party content provider of the resource server 104 when the resource is requested by the client device 108. The resource may include a web page, an application, or any other presentation of information to a user via the client device 108.

The client device 108 may be a computing device operated by a user, which, when accessing a resource of the resource server 104, can make a request to the content item selection system 110 for content items to be presented with the resource, for instance. The client device 108 may be represented by a device identifier. The content item request can include requesting device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.) and resource information (e.g., URL of the requested resource, one or more keywords of the content of the requested resource, text of the content of the resource, a title of the resource, a category of the resource, a type of the resource, etc.). The information that the content item selection system 110 receives can include a HyperText Transfer Protocol (HTTP) cookie which contains a device identifier (e.g., a random number) that represents the client device 108.

In some implementations, the device information and/or the resource information may be appended to a content item request URL (e.g., contentitem.item/page/contentitem?devid=abc123&devnfo=A34r0). In some implementations, the device information and/or the resource information may be encoded prior to being appended to the content item request URL. The requesting device information and/or the resource information may be utilized by the content item selection system 110 to select third-party content items and/or a third-party content provider for a content item to be served with the requested resource and presented on a display of a client device 108.

While the foregoing has provided an overview of a system 100 for selecting and serving content items to client devices 108 and/or collecting analytics data for an analytics system 112, implementations for conditionally joining data from one or more cookies will be described in greater detail below.

Figure 2:
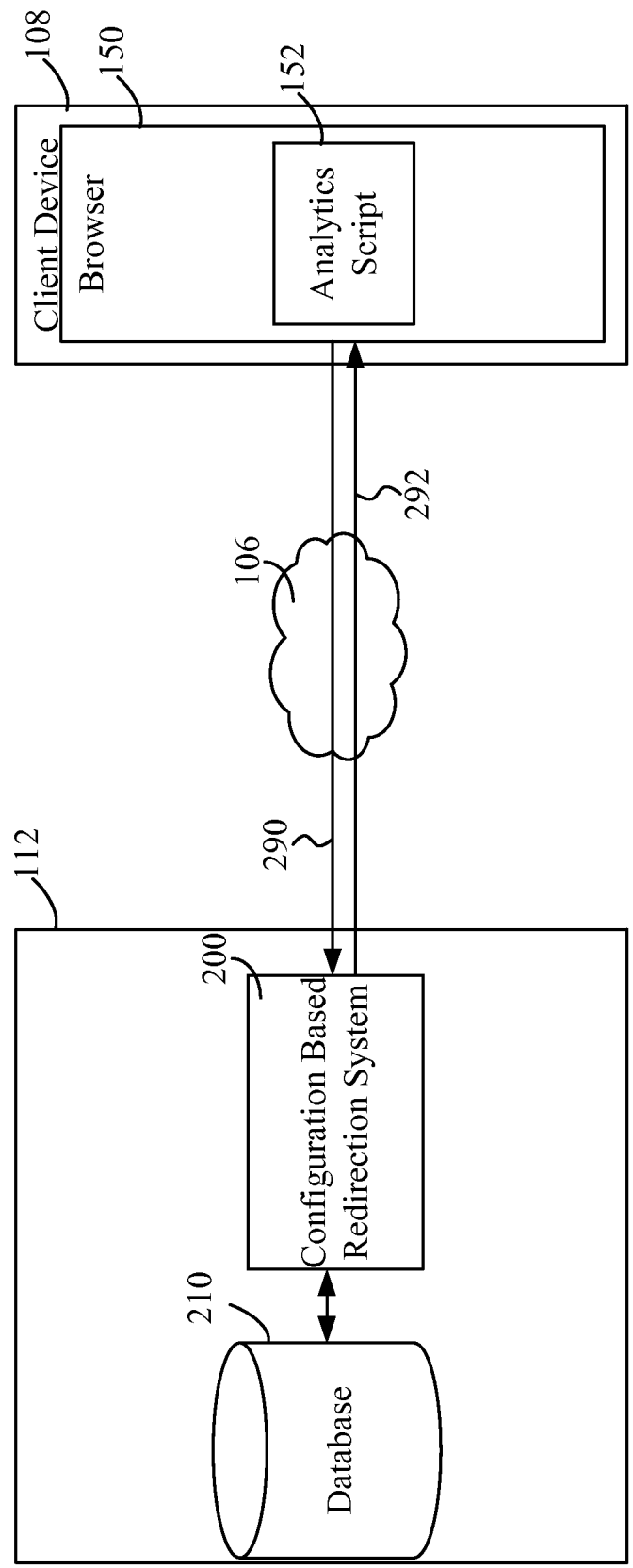
FIG. 2 is a block schematic diagram depicting an implementation of an analytics system having a configuration based redirection system responding to a request from a client device with a redirection response.

FIG. 2 depicts a block schematic diagram depicting an implementation of an analytics system 112 having a configuration based redirection system 200 responding to a request 290 from a client device 108 with a redirection response 292. The client device 108 may execute an application for a browser 150. A user of the client device 108 may enter a URI or URL into a portion of an interface of the browser 150, such as an address bar, that causes the browser 150 to request data for a resource located at the entered URI or URL. The request may be transmitted to a resource server, such as resource server 104 of FIG. 1, from the client device 108 using communications equipment of the client device. The data received responsive to the request from the resource server for the requested resource may include code that causes the browser 150 to transmit a request to another system, such as the analytics system 112.

In some implementations, the data for the resource may include an analytics script 152 for the resource that, when executed by the client device 108, causes the client device 108 to transmit a request 290 to the analytics system 112. In other implementations, mark-up language for the resource may include a portion that, when executed by the browser on the client device, causes the client device to transmit the request 290 to the analytics system 112. The request 290 may include a device identifier associated with the client device 108, a third-party identifier associated with a publisher of the resource, a join identifier based, at least in part, on the device identifier and/or the third-party identifier, and first data. The first data may include analytics data based on device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.), usage information associated with usage of the resource, and/or other analytics data. In some implementations, the request 290 may further include data, such as a parameter, identifying a type of hit associated with the request 290 (e.g., an original type of hit, a redirection hit, etc.).

In some implementations, the analytics script 152 may parse the code for the resource and/or detect whether one or more files, plugins, and/or other features are present for the resource based on the resource data. If the one or more files, plugins, and/or other features are present, then the request 290 may include data, such as a parameter, indicative of the presence of such features for the resource. That is, if the resource has been modified to include the coding and/or other aspects needed to implement one or more features, the request 290 may include data indicating the presence such that the configuration based redirection system 200 may not send a redirection response 292 responsive to the request 290.

In some implementations, the analytics script 152 may also check for the presence of a data file, such as a cookie, prior to transmitting the request 290 and, if the data file is not present, then the analytics script 152 may cause the client device 108 to write and store data for the data file in a storage device of the client device 108. The data for the data file may include a generated join identifier based on a client identifier associated with the client device 108 and a third-party identifier associated with a publisher of the resource to generate a globally unique identifier. The data file may further include data, such as a parameter, identifying a type of hit associated with the request 290 (e.g., an original type of hit, a redirection hit, etc.). The data file may also include other data, such as the device identifier associated with the client device 108, the third-party identifier associated with a publisher of the resource, and/or the first data.

If the data file is present, then the analytics script 152 may set the join identifier to an empty value. The presence of the data file with the empty join identifier may cause a remarketing system of the content item selection system 110 to determine whether a remarketing content item should be selected and served to the client device 108 responsive to a request for a content item.

The request 290 having the device identifier associated with the client device 108, the third-party identifier associated with the publisher of the resource, the join identifier based, at least in part, on the device identifier and/or the third-party identifier, and the first data may be received by the analytics system 112. The analytics system 112 may store the first data associated with the device identifier, third-party identifier, and join identifier to be later combined with other data associated with the device identifier, third-party identifier, and join identifier. In some implementations, the request 290 may further include data, such as a parameter, identifying a type of hit associated with the request 290 (e.g., an original type of hit, a redirection hit, etc.).

The configuration based redirection system 200 may retrieve configuration data from a database 210 based on the received third-party identifier. In some implementations, the configuration based redirection system 200 may query the database 210 with the third-party identifier associated with the publisher of the resource to retrieve configuration data associated with the publisher. In other implementations, the configuration data for one or more publishers may be retrieved at predetermined intervals and stored in a cache file to reduce the queries to the database 210. Thus, the configuration based redirection system 200 may compare the received third-party identifier associated with the publisher of the request 290 to the third-party identifiers of the cached configuration data.

The configuration data includes data indicative of one or more services selected by and/or activated by a publisher associated with the third-party identifier. That is, the configuration data may include data for settings set by the publisher of the resource, such as activation of a remarketing feature. If the configuration data includes data indicative of one or more services selected by and/or activated by the publisher, then the configuration based redirection system 200 may respond to the request 290 with a redirection response 292. The redirection response 292 includes a redirection destination and the join identifier of the request 290. The redirection response 292 may be a 302 response having a redirection URI or URL specified by the configuration based redirection system 200. The redirection destination may be to another service of the analytics system 112 and/or content item selection system 110 (e.g., a second service, such as a remarketing service or system) or to a separate system.

If the configuration data does not include data indicative of one or more services selected by and/or activated by the publisher and/or data from the configuration data indicates that the publisher does not want redirections, then an acknowledgement response may be transmitted responsive to the request 290, such as a 200 OK response, thereby resulting in the client device 108 not submitting a subsequent request.

Figure 3:
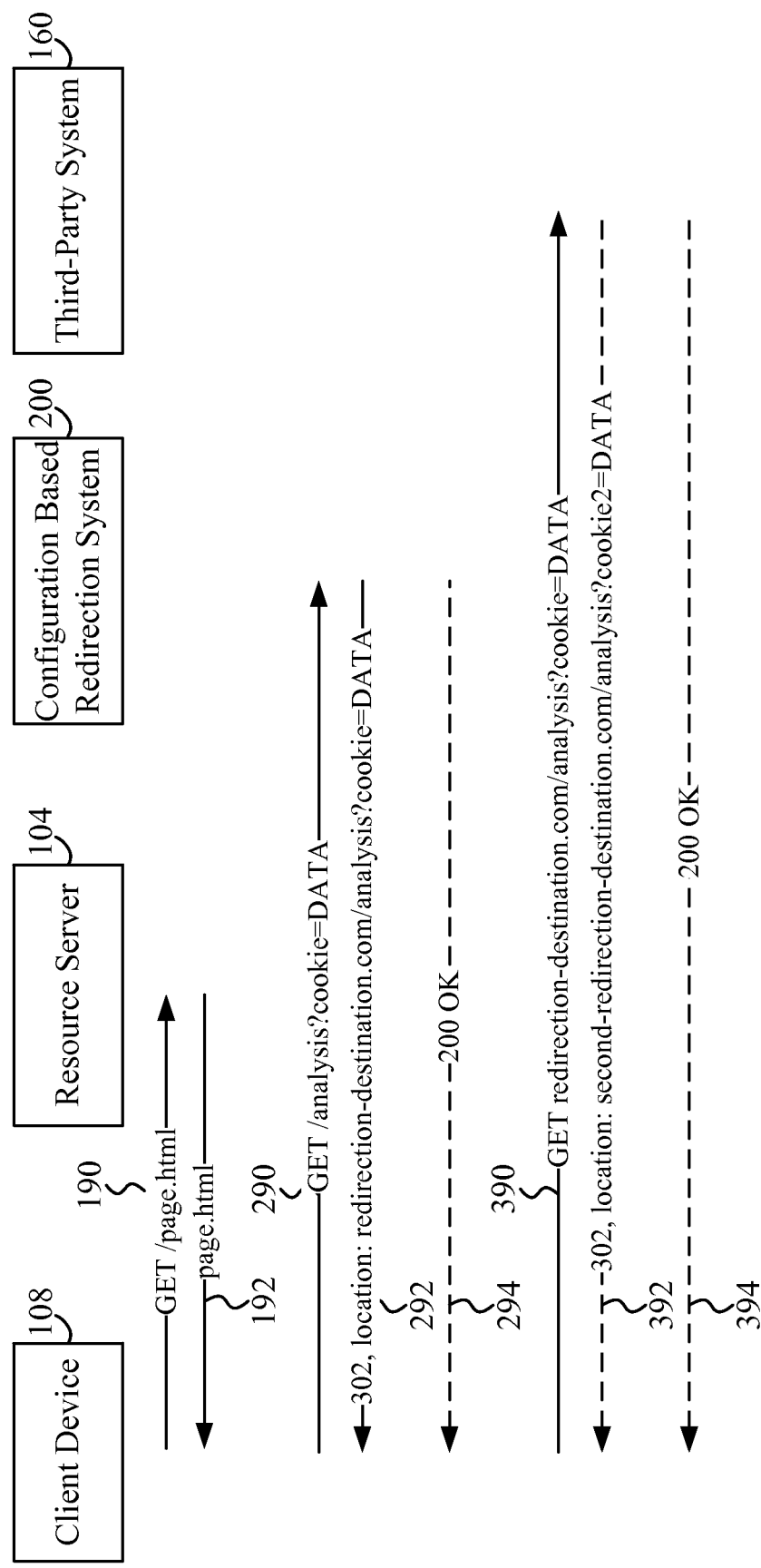
FIG. 3 is a process flow diagram depicting an implementation of a process flow of requests and redirection responses for a client device and one or more systems.

FIG. 3 depicts a process flow diagram of an implementation of a process flow 300 of requests and redirection responses for a client device 108 and one or more systems, such as a resource server 104, the configuration based redirection system 200, and/or a third-party system 160. A user of the client device 108 may enter a URI or URL into a portion of an interface of the browser 150, such as an address bar, that causes the browser 150 to transmit a request 190, such as a GET request, for data for a resource located at the entered URI or URL, such as at the resource server 104. Responsive to the request 190, the resource server 104 transmits a response 192 with the data for the requested resource. The data may include code, such as the analytics script 152 or mark-up language for the resource, that, when executed by the client device 108, causes the client device 108 to transmit a request 290 to configuration based redirection system 200 of the analytics system 112. The request 290 may include a device identifier associated with the client device 108, a third-party identifier associated with a publisher of the resource, a join identifier based, at least in part, on the device identifier and/or the third-party identifier, and first data.

As noted above, the configuration based redirection system 200 may retrieve configuration data based on the received third-party identifier. In some implementations, the configuration based redirection system 200 may query a database with the third-party identifier to retrieve configuration data or configuration data stored in a cache file may be checked for the received third-party identifier of the request 290.

If the configuration data does not include data indicative of one or more services selected by and/or activated by the publisher and/or data from the configuration data indicates that the publisher does not want redirections, then an acknowledgement response 294 may be transmitted responsive to the request 290, such as a 200 OK response, thereby resulting in the client device 108 not submitting a subsequent request.

If the configuration data includes data indicative of one or more services selected by and/or activated by the publisher associated with the third-party identifier, then the configuration based redirection system 200 may respond to the request 290 with a redirection response 292. The redirection response 292 includes a redirection destination and the join identifier of the request 290. The redirection response 292 may be a 302 response having a redirection URI or URL specified by the configuration based redirection system 200. The redirection destination may be to another service of the analytics system 112 and/or content item selection system 110 (e.g., a second service, such as a remarketing service or system) or to a separate system.

When the client device 108 executing a browser receives the redirection response 292 with the redirection destination, the browser sends a second, subsequent request 390 to the redirection destination specified in the redirection response 292. The second request 390 may include the join identifier and data associated with the second request 390, such as first data or separate second data. In some implementations, the second request 390 may also include the device identifier associated with the client device 108. For instance, the second request 390 may be a request to the analytics system 112 and/or a third party system 160 that includes the device identifier, join identifier, and the first or second data. The second data may be second cookie data, such as third-party cookie data, that is different from the first data, which may be first cookie data, such as analytics data. The second data and first data may be combinable and/or associated based on the common join identifier.

In some implementations, responsive to the second request 390, an acknowledgement response 394 may be transmitted, such as a 200 OK response, thereby resulting in the client device 108 not submitting a subsequent request. That is, if the third-party system 160 and/or the analytics system 112 receives the second request 390 and determines no additional redirection response is needed, then the third-party system 160 and/or the analytics system 112 may transmit the acknowledgement response 394 to end the redirections.

In other implementations, the third-party system 160 and/or the analytics system 112 may determine an additional redirection response 392 is needed. The second redirection response 392 may be transmitted to the client device 108 with a second redirection destination and the join identifier responsive to the second request 390. Thus, the client device 108 may be further redirected to the second redirection destination and may, in some implementations, transmit third data with a third request responsive to the second redirection response 392.

Further redirection responses and further requests may occur to collect and/or generate data that may be combined based on the common join identifier. If no further redirection destination is indicated, then an acknowledgement response may be transmitted responsive to a request, such as a 200 OK response, thereby resulting in the client device 108 not submitting a subsequent request.

Figure 4:
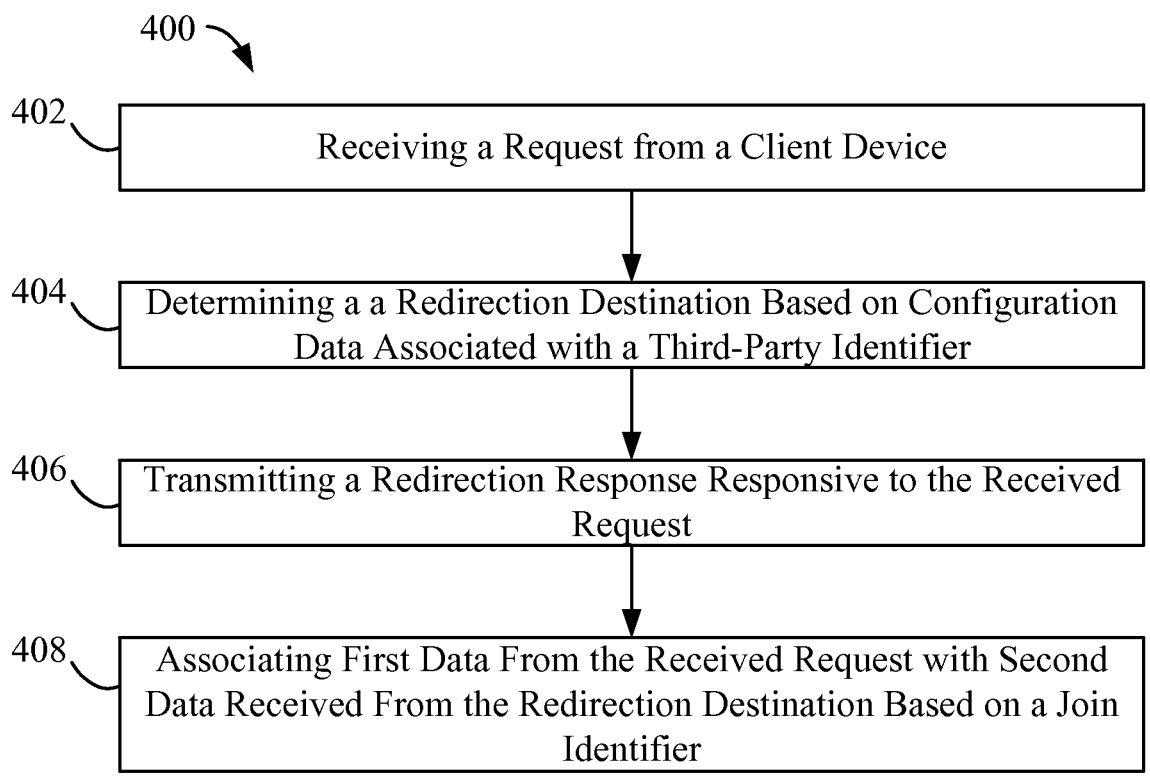
FIG. 4 is a flow diagram of an implementation of a process for an analytics system having a configuration based redirection system.

FIG. 4 depicts a flow diagram of an implementation of a process 400 for an analytics system, such as analytics system 112, having a configuration based redirection system, such as configuration based redirection system 200. The process 400 includes receiving a request from a client device (block 402). In some implementations, the request may be received responsive to execution of an analytics script for a resource and/or mark-up language for the resource being executed by the client device. The request may include a device identifier associated with the client device, a third-party identifier associated with a publisher of the resource, a join identifier based, at least in part, on the device identifier and/or the third-party identifier, and first data. The first data may include analytics data based on device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.), usage information associated with usage of the resource, and/or other analytics data. The analytics data may be retrieved from an analytics cookie stored in a storage device of the client device. In some implementations, the request may further include data, such as a parameter, identifying a type of hit associated with the request 290 (e.g., an original type of hit, a redirection hit, etc.).

The process 400 also includes determining a redirection destination based on configuration data associated with a third-party identifier (block 404). The configuration data may be retrieved from a database based on the received third-party identifier and/or may be retrieved from a cache file based on the received third-party identifier. The configuration data includes data indicative of one or more services selected by and/or activated by a publisher associated with the third-party identifier. A redirection destination may be determined based on the one or more services selected by and/or activated by the publisher. For instance, the configuration data may include a URI or URL for each of the one or more services associated with the data indicative of whether the one or more services is selected or activated. In other implementations, the redirection destination may be determined by querying a separate data file and/or database based on the data indicative of one or more services.

The process 400 further includes transmitting a redirection response responsive to the received request from the client device (block 406). If the configuration data includes data indicative of one or more services selected by and/or activated by the publisher, then a redirection response may be transmitted to the client device responsive to the received request. The redirection response may include the redirection destination and the join identifier of the request. In some implementations, the redirection response may be a 302 response having a redirection URI or URL specified to which the client device is redirected. The redirection destination may be to another service of an analytics system and/or of a content item selection system or to a separate system.

The process 400 still further includes associating first data from the received request with second data received from the redirection destination based on the join identifier (block 408). As discussed above, the first data may include analytics data that is received when the client device transmits the request. The first data is associated with the join identifier and the join identifier is transmitted with the redirection response to the client device with the redirection destination. Responsive to receiving the redirection response, such as a 302 response, a browser executing on the client device may transmit a second request to another service and/or system. For instance, the second request may be transmitted to the same system, such as an analytics system, as the first request, but may be to a different URI or URL for a different service. In other instances, the second request may be transmitted to another system. The second request includes the join identifier and first or second data associated with the second request. In some instances, the second data may be third-party cookie data that is transmitted to the analytics system or third-party system with the second request. In some instances, the third-party system may transmit the second data to the analytics system and/or allow the analytics system to access and/or retrieve the second data from the third-party system. The first data from the received request may then be associated with the second data received from the redirection destination based on the join identifier that is common to both the first data and the second data. In some implementations, the configuration data may also be used to combine the first data with the second data from the redirection destination, either in addition to or in lieu of the join identifier.

Figure 5:
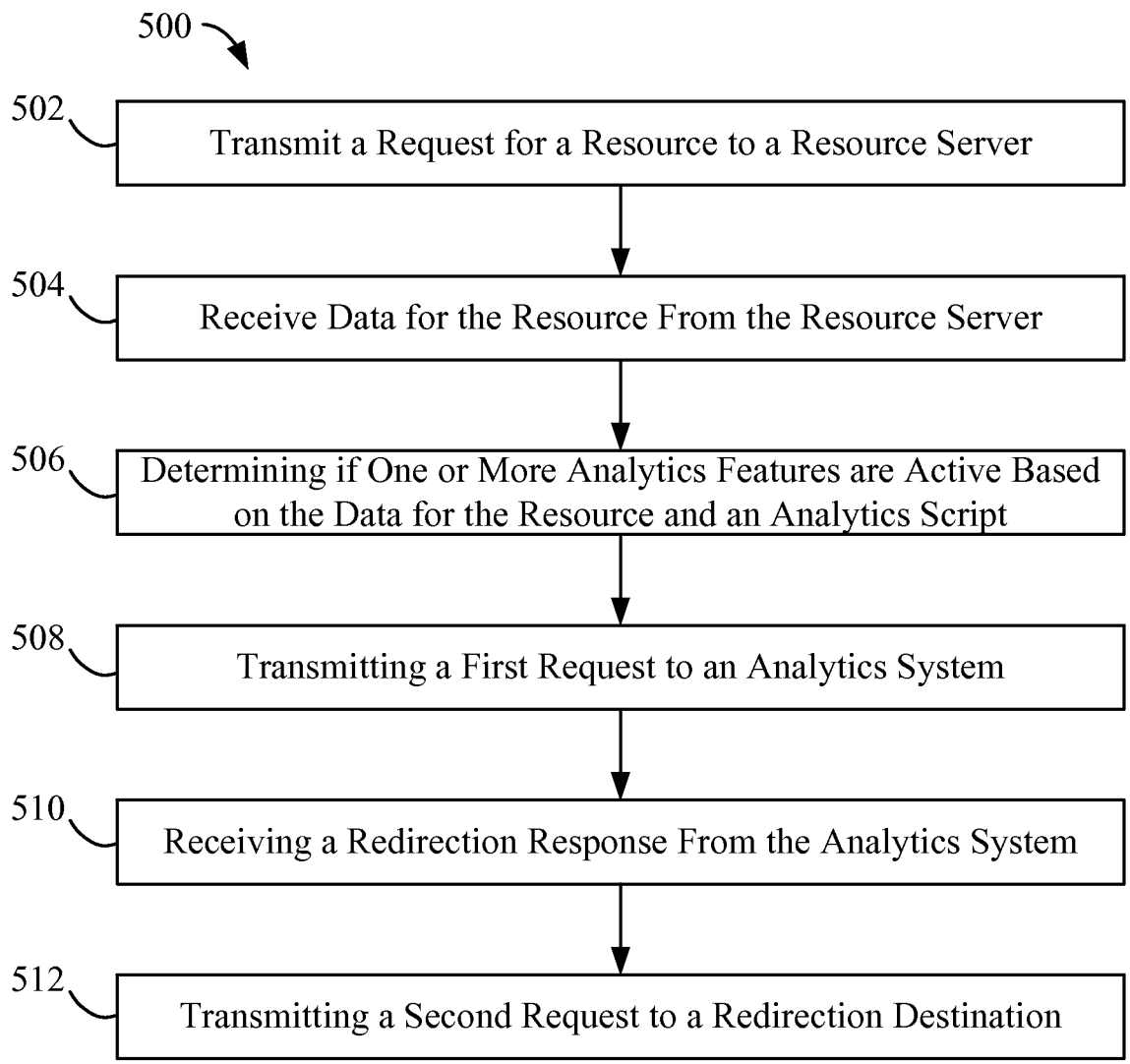
FIG. 5 is a flow diagram of an implementation of a process for a client transmitting requests and receiving redirection responses from an analytics system having a configuration based redirection system.

FIG. 5 is a flow diagram of an implementation of another process 500 for a client device to transmit requests and receive redirection responses from an analytics system having a configuration based redirection system. The process 500 includes transmitting a request for a resource to a resource server (block 502). A user of the client device may enter a URI or URL into a portion of an interface, such as an address bar, of a browser executing on the client device that causes the client device to transmit a request, such as a GET request, for data for a resource located at the entered URI or URL at the resource server.

Responsive to the request, the resource server transmits a response with the data for the requested resource. The client device receives the data for the resource from the resource server (block 504). The data may include code, such as an analytics script or mark-up language for the resource, that, when executed by the client device, causes the client device to perform various actions. For instance, the process 500 may further include determining if one or more analytics features are active based on the data for the resource and the analytics script (block 506). In some implementations, when the analytics script is executed by the client device, the client device may parse the code for the resource and/or detect whether one or more files, plugins, and/or other features are present for the resource based on the resource data.

The process 500 also includes transmitting a first request to an analytics system (block 508). When the client device executes the analytics script, the analytics script may define the destination, such as an analytics server, for the transmitted first request and the data to be transmitted with the first request. In other implementations, mark-up language for the resource may include a portion that, when executed by the browser executing on the client device, causes the client device to transmit the first request to the analytics system.

The transmitted first request may include a device identifier associated with the client device, a third-party identifier associated with a publisher of the resource, a join identifier based, at least in part, on the device identifier and/or the third-party identifier, and first data. In some implementations, the join identifier may be an identifier from a pseudorandom generator that utilizes the device identifier and/or third-party identifier for the random seed (e.g., a seed based on the device identifier, a seed based on the third-party identifier, a seed based on the sum of the device identifier and third-party identifier, a seed based on the remainder of the device identifier from the third-party identifier, a seed based on the multiple of the device identifier and third-party identifier, etc.).

The first data of the transmitted first request may include analytics data based on device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.), usage information associated with usage of the resource, and/or other analytics data. In some implementations, the request may further include data, such as a parameter, identifying a type of hit associated with the request (e.g., an original type of hit, a redirection hit, etc.). In some implementations, the first data may be first cookie data.

In some implementations, if the one or more files, plugins, and/or other features are determined to be present and/or active based on the data for the resource, then the transmitted first request may include data, such as a parameter, indicative of the presence of such features for the resource. That is, if the data for the resource has been modified to include the coding, files, plugins, and/or other data needed to implement one or more features, the transmitted first request may include data indicating the presence such that a configuration based redirection system may not send a redirection response responsive to the transmitted first request.

In some implementations, the analytics script may also check for the presence of a data file, such as a cookie, prior to transmitting the first request and, if the data file is not present, then the analytics script may cause the client device to write and store data for the data file in a storage device of the client device prior to transmitting the first request. The data for the data file may include a generated join identifier based on the client identifier associated with the client device and/or the third-party identifier associated with the publisher of the resource to generate a globally unique identifier. The data file may further include data, such as a parameter, identifying a type of hit associated with the request (e.g., an original type of hit, a redirection hit, etc.). The data file may also include other data, such as the device identifier associated with the client device, the third-party identifier associated with a publisher of the resource, and/or the first data.

If the data file is present, then the analytics script may set the join identifier to an empty value. The presence of the data file with the empty join identifier may cause a remarketing system of a content item selection system to determine whether a remarketing content item should be selected and served to the client device responsive to a request for a content item.

The transmitted first request may be transmitted and/or routed to a configuration based redirection system of the analytics system. The configuration based redirection system retrieves configuration data from a database and/or a cached configuration data file based on the received third-party identifier. The configuration data includes data indicative of one or more services selected by and/or activated by a publisher associated with the third-party identifier. That is, the configuration data may include data for settings set by the publisher of the resource, such as activation of a remarketing feature.

If the configuration data does not include data indicative of one or more services selected by and/or activated by the publisher and/or data from the configuration data indicates that the publisher does not want redirections, then an acknowledgement response may be transmitted responsive to the transmitted first request, such as a 200 OK response, thereby resulting in the client device not submitting a subsequent request.

If the configuration data includes data indicative of one or more services selected by and/or activated by the publisher, then the configuration based redirection system may respond to the transmitted first request with a redirection response. The redirection response includes a redirection destination and the join identifier of the transmitted first request. The redirection response includes a redirection URI or URL specified by the configuration based redirection system, such as that of another service of the analytics system and/or content item selection system (e.g., a second service, such as a remarketing service or system) or to a separate system.

The client device receives the redirection response from the analytics system (block 510). The redirection response may be a 302 response that, when received by a browser executing on the client device, causes the client device to send a subsequent request to a redirection destination specified in the redirection response. In some implementations, the redirection destination may include the join identifier with the redirection destination (e.g., appended to the URI or URL) and/or may include the join identifier separately with the redirection response.

The process 500 still further includes transmitting a second request to the redirection destination (block 512). Responsive to receiving the redirection response, such as a 302 response, a browser executing on the client device transmits a second request to the redirection destination, such as another service and/or system. For instance, the second request may be transmitted to the same system, such as an analytics system, as the first request, but may be to a different URI or URL for a different service. In other instances, the second request may be transmitted to another system. The second request includes the join identifier and first or second data associated with the second request. In some instances, the second data may be second cookie data, such as third-party data, that is transmitted to the analytics system or a third-party system with the second request. In some instances, the third-party system may transmit the second data to the analytics system and/or allow the analytics system to access and/or retrieve the second data from the third-party system. The first data from the transmitted first request may be associated with the second data received from the redirection destination based on the join identifier that is common to both the first data and the second data.

Figure 6:
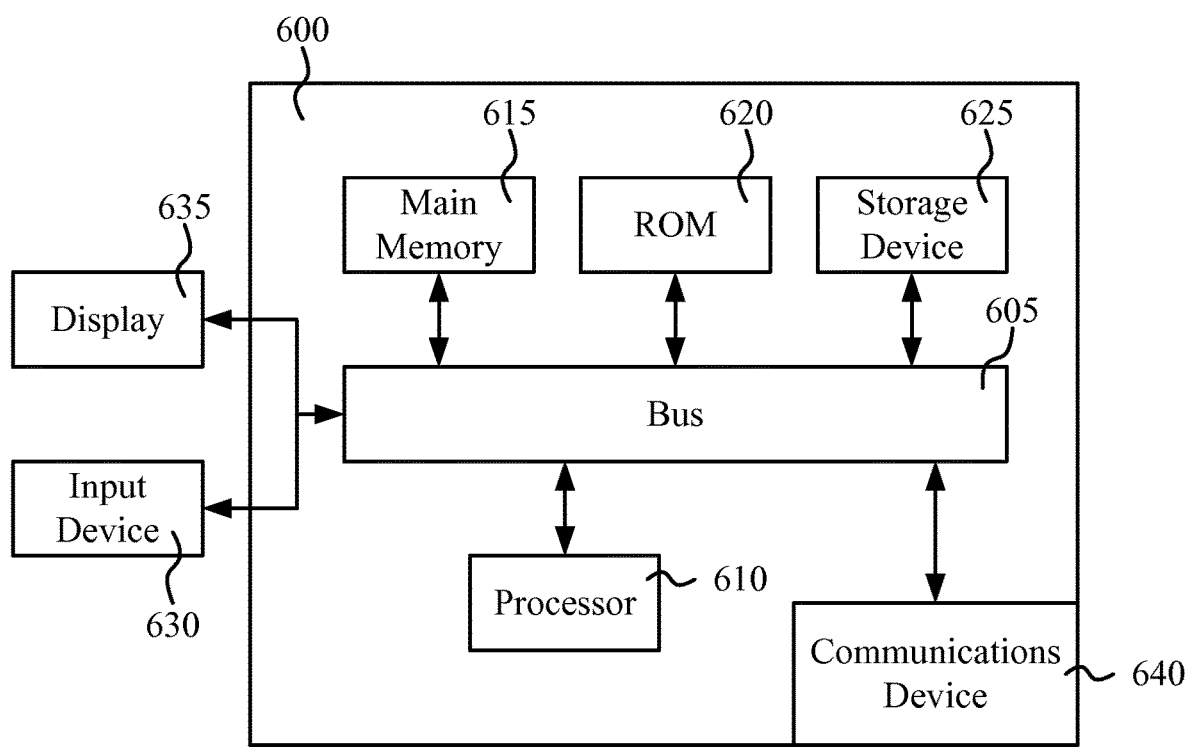
FIG. 6 is a block diagram depicting a general architecture for a computer system that may be employed to implement various elements of the systems and methods described and illustrated herein.

FIG. 6 is a block diagram of a computer system 600 that can be used to implement the client device 108, content item selection system 110, third-party content server 102, resource server 104, analytics system 112, configuration based redirection system 200, etc. The computing system 600 includes a bus 605 or other communication component for communicating information and a processor 610 coupled to the bus 605 for processing information. The computing system 600 can also include one or more processors 610 coupled to the bus for processing information. The computing system 600 also includes a main memory 615, such as a RAM or other dynamic storage device, coupled to the bus 605 for storing information, and instructions to be executed by the processor 610. The main memory 615 can also be used for storing position information, temporary variables, or other intermediate information during execution of instructions by the processor 610. The computing system 600 may further include a ROM 620 or other static storage device coupled to the bus 605 for storing static information and instructions for the processor 610. A storage device 625, such as a solid state device, magnetic disk or optical disk, is coupled to the bus 605 for persistently storing information and instructions. The computing system 600 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 600 may be coupled via the bus 605 to a display 635, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 630, such as a keyboard including alphanumeric and other keys, may be coupled to the bus 605 for communicating information and command selections to the processor 610. In another implementation, the input device 630 may be integrated with the display 635, such as in a touch screen display. The input device 630 can include a cursor control, such as a mouse, a trackball, or cursor direction keys, for communicating direction information and command selections to the processor 610 and for controlling cursor movement on the display 635.

According to various implementations, the processes and/or methods described herein can be implemented by the computing system 600 in response to the processor 610 executing an arrangement of instructions contained in the main memory 615. Such instructions can be read into the main memory 615 from another computer-readable medium, such as the storage device 625. Execution of the arrangement of instructions contained in the main memory 615 causes the computing system 600 to perform the illustrative processes and/or method steps described herein. One or more processors in a multi-processing arrangement may also be employed to execute the instructions contained in the main memory 615. In alternative implementations, hard-wired circuitry may be used in place of or in combination with software instructions to effect illustrative implementations. Thus, implementations are not limited to any specific combination of hardware circuitry and software.

The computing system 600 also includes a communications device 640 that may be coupled to the bus 605 for providing a communication link between the computing system 600 and the network 106. As such, the communications device 640 enables the processor 610 to communicate, wired or wirelessly, with other electronic systems coupled to the network 106. For instance, the communications device 640 may be coupled to an Ethernet line that connects the computing system 600 to the Internet or another network 106. In other implementations, the communications device 640 may be coupled to an antenna (not shown) and provides functionality to transmit and receive information over a wireless communication interface with the network 106.

In various implementations, the communications device 640 may include one or more transceivers configured to perform data communications in accordance with one or more communications protocols such as, but not limited to, WLAN protocols (e.g., IEEE 802.11 a/b/g/n/ac/ad, IEEE 802.16, IEEE 802.20, etc.), PAN protocols, Low-Rate Wireless PAN protocols (e.g., ZigBee, IEEE 802.15.4-2003), Infrared protocols, Bluetooth protocols, EMI protocols including passive or active RFID protocols, and/or the like.

The communications device 640 may include one or more transceivers configured to communicate using different types of protocols, communication ranges, operating power requirements, RF sub-bands, information types (e.g., voice or data), use scenarios, applications, and/or the like. In various implementations, the communications device 640 may comprise one or more transceivers configured to support communication with local devices using any number or combination of communication standards.

In various implementations, the communications device 640 can also exchange voice and data signals with devices using any number or combination of communication standards (e.g., GSM, CDMA, TDNM, WCDMA, OFDM, GPRS, EV-DO, WiFi, WiMAX, S02.xx, UWB, LTE, satellite, etc). The techniques described herein can be used for various wireless communication networks 106 such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. A CDMA network can implement a radio technology such as Universal Terrestrial Radio Access (UTRA), cdma2000, etc. UTRA includes Wideband-CDMA (W-CDMA) and Low Chip Rate (LCR). CDMA2000 covers IS-2000, IS-95, and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

Although an implementation of a computing system 600 has been described in reference to FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processor," "computing system," and/or "processing circuit" encompass all kinds of apparatus, devices, and machines for processing data, including a programmable processor, a computer, a system on a chip, or multiple ones, a portion of a programmed processor, or combinations of the foregoing. The apparatus can include special purpose logic circuitry, e.g., an FPGA or an ASIC.

The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, for instance, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, for instance, semiconductor memory devices, e.g., EPROM, EEPROM, and flash memory devices; magnetic disks, e.g., internal hard disks or removable disks; magneto optical disks; and CD ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for instance, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method comprising:
   receiving, by one or more data processors, a first request from a client device for a first resource to be presented by a browser of the client device;
   transmitting, by the one or more data processors, a first response to the client device, the first response comprising data associated with the resource and a script that is configured to cause the browser to transmit a second request, the second request comprising a device identifier associated with the client device, a third-party identifier associated with a publisher of the resource, a join identifier, and first cookie data associated with the publisher of the resource, the join identifier generated based on the device identifier and the third-party identifier;
   receiving, by the one or more data processors, the second request from the client device;
   retrieving, by the one or more data processors, configuration data using the received third-party identifier, the configuration data comprising data indicative of one or more services activated by the publisher of the resource;
   determining, using the one or more data processors, a redirection destination based on the configuration data associated with the third-party identifier;
   transmitting, using the one or more data processors and to the client device, a redirection response responsive to the second request, the redirection response comprising the redirection destination and the join identifier, wherein the redirection response is configured to cause the client device to transmit a third request comprising second cookie data associated with the join identifier to the redirection destination, the second cookie data associated with a content provider that provides a content item in a content item slot on the resource in which a selected and served third-party content item may be displayed, wherein a code defining the content item slot for the resource includes instructions to request the third-party content item; and
   associating, using the one or more data processors, the first cookie data with the second cookie data based on the join identifier.

2. The method of claim 1, wherein the second request is received by a first service of an analytics system, and wherein the redirection destination is associated with a second service of the analytics system.

3. The method of claim 2, further comprising: receiving, by the one or more data processors, the third request from the client device, the third request comprising the join identifier and the second cookie data.

4. The method of claim 3, wherein the redirection response is a first redirection response and the redirection destination is a first redirection destination, the method further comprising: transmitting, using one or more data processors and to the client device, a second redirection response responsive to the third request received by the analytics system, the second redirection response comprising a second redirection destination and the join identifier.

5. The method of claim 1, wherein the join identifier is a globally unique identifier.

6. The method of claim 1, wherein the first request is received by a first service of an analytics system, and wherein the redirection destination is associated with a second service of a separate system.

7. The method of claim 6, wherein the second request is received by a second service of the analytics system.

8. The method of claim 1, wherein the second request further comprises a parameter identifying a type of hit associated with the second request.

9. A system comprising:
   one or more data processors; and one or more storage devices storing instructions that, when executed by the one or more data processors, cause the one or more data processors to perform operations comprising:
   receiving, at a first service of an analytics system, a first request from a client device for a resource to be presented by a browser of the client device;
   transmitting, from the analytics system, a first response to the client device, the first response comprising data associated with the first resource and a first script that is configured to cause the browser to transmit a second request, the second request comprising a device identifier associated with the client device, a third-party identifier associated with a publisher of the first resource, a join identifier, and first cookie data associated with the publisher of the resource, the join identifier generated based on the device identifier and the third-party identifier;

receiving, at a second service of the analytics system, the second request from the client device;

retrieving, at the second service of the analytics system, configuration data using the received third-party identifier, the configuration data comprising data indicative of one or more services activated by the publisher of the resource;

determining a redirection destination associated with the second service of the analytics system based on the configuration data associated with the third-party identifier;

transmitting to the client device a redirection response comprising the redirection destination and the join identifier, wherein the redirection response is configured to cause the client device to transmit a third request comprising second cookie data associated with the join identifier to the redirection destination, the second cookie data associated with a content provider that provides a content item in a content item slot on the resource in which a selected and served third-party content item may be displayed, wherein a code defining the content item slot for the resource includes instructions to request the third-party content item; and associating the first cookie data from the received second request with the second cookie data from the redirection destination based on the join identifier.

10. The system of claim 9, wherein the one or more storage devices store instructions that cause the one or more data processors to perform operations further comprising: receiving the third request from the client device, the third request comprising the join identifier and the second cookie data.

11. The system of claim 10, wherein the one or more storage devices store instructions that cause the one or more data processors to perform operations further comprising: transmitting a second redirection response responsive to the third request, the second redirection response comprising a second redirection destination and the join identifier.

12. The system of claim 9, wherein the join identifier is a globally unique identifier.

13. The system of claim 9, wherein the configuration data comprises a URI or URL for each of the one or more services activated by the publisher of the first resource.

14. The system of claim 9, wherein the second request further comprises a parameter identifying a type of hit associated with the second request.

* * * * *